UNITED STATES PATENT OFFICE.

AXEL BRETTEVILLE, OF NOTODDEN, NORWAY, ASSIGNOR TO NORSK-HYDRO-ELEKTRISK KVAELSTOFAKTIESELSKAB, OF KRISTIANIA, NORWAY.

DICALCIUM-PHOSPHATE FERTILIZER.

1,011,909.      Specification of Letters Patent.      Patented Dec. 19, 1911.

No Drawing.      Application filed April 24, 1911. Serial No. 622,954.

*To all whom it may concern:*

Be it known that I, AXEL BRETTEVILLE, a subject of the King of Norway, residing at Notodden, Norway, have invented certain new and useful Improvements in Dicalcium-Phosphate Fertilizers; and I do hereby declare the following to be a full, clear, and exact description of the invention, such as will enable others skilled in the art to which it appertains to make and use the same.

This invention relates to dicalcium-phosphate fertilizers and has for its object to eliminate the tendency of such fertilizers to make dust on being spread.

The dicalcium-phosphate precipitate of commerce is usually manufactured by dissolving natural phosphates in an acid and precipitating dicalcium-phosphate by means of for instance lime, and subsequently separating the diphosphate from the soluble calcium salts by pressing and washing operations. The product obtained in this manner is a light powder, which in use has the drawback of being very liable to form dust, so that it blows away on being spread on the fields. It would be a very great advantage, if this drawback could be eliminated, and according to the present invention this is obtained by manufacturing the di-phosphate in such a manner as to leave a small amount of nitrate of lime in the product uniformly distributed in the mass of the same and so that each particle of the phosphate is completely embedded in nitrate of lime or covered by a thin film of this latter. This may be obtained by proceeding as follows: The phosphate employed as a raw material is dissolved in nitric acid and lime or another suitable precipitant added to the solution, whereby a precipitate consisting of dicalcium-phosphate of lime is formed. The bulk of the solution containing nitrate of lime is thereupon separated from the precipitate by a filtering or pressing operation, but after this pressing the mass is either not at all or only incompletely washed with water before it is finally dried. Owing to this treatment the resulting product will contain some nitrate of lime uniformly distributed through the whole mass. On account of this product containing both nitrogen and phosphoric acid, the product is an excellent fertilizer. When the mass is dried the content of nitrate of lime, which was at first present in the condition of a solution, will exert a conglutinating effect, so that the resulting mass will be sufficiently dense to be unable of making dust on its being spread on the fields but at the same time the mass is not at all hygroscopic.

I claim:

1. As a new article of manufacture a fertilizer consisting chiefly of di-calcium phosphate and containing some nitrate of lime uniformly distributed through the mass.

2. As a new article of manufacture a fertilizer consisting chiefly of di-calcium phosphate and containing some nitrate of lime, uniformly distributed through the mass in such a manner as to inclose as a thin film each particle of the phosphate.

3. The process of manufacturing di-calcium phosphate fertilizers, which consists in dissolving the phosphate used as a raw material in nitric acid, adding a precipitant to the solution, separating the greater part of the solution from the precipitate and drying this latter.

4. The process of manufacturing di-calcium phosphate fertilizers, which consists in dissolving the phosphate used as a raw material in nitric acid adding lime to the solution separating the bulk of solution, containing nitrate of lime from the precipitate by means of filtering or pressing and drying the precipitate without first removing the remainder of nitrate of lime from the same.

In testimony that I claim the foregoing as my invention, I have signed my name in presence of two subscribing witnesses.

AXEL BRETTEVILLE.

Witnesses:
    MARTIN GUTTORMSEN,
    NANA PEDERSON.